(12) United States Patent
Li

(10) Patent No.: US 8,891,968 B2
(45) Date of Patent: Nov. 18, 2014

(54) METHOD AND APPARATUS FOR LOADING, DETECTING, AND MONITORING CHANNEL-ASSOCIATED OPTICAL SIGNALS

(75) Inventor: Congqi Li, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 327 days.

(21) Appl. No.: 13/310,425

(22) Filed: Dec. 2, 2011

(65) Prior Publication Data

US 2012/0076497 A1 Mar. 29, 2012

Related U.S. Application Data

(63) Continuation of application No. 12/195,717, filed on Aug. 21, 2008, now Pat. No. 8,280,248, which is a continuation of application No. PCT/CN2006/003131, filed on Nov. 21, 2006.

(30) Foreign Application Priority Data

Feb. 21, 2006 (CN) .......................... 2006 1 0033905

(51) Int. Cl.
*H04J 4/00* (2006.01)
*H04B 10/077* (2013.01)
(52) U.S. Cl.
CPC ...... *H04B 10/0775* (2013.01); *H04B 2210/074* (2013.01); *H04B 2210/072* (2013.01)
USPC .............................. 398/77; 398/183; 398/198
(58) Field of Classification Search
CPC .. H04B 10/075; H04B 10/073; H04B 10/077; H04B 10/0775; H04B 10/0795; H04B 2210/072; H04B 2210/074; H04B 2210/075
USPC ........... 398/77, 32, 183, 182, 78, 98, 99, 186, 398/187, 198, 200, 201
See application file for complete search history.

(56) References Cited

U.S. PATENT DOCUMENTS

| | | | |
|---|---|---|---|
| 5,212,534 A | 5/1993 | Bianchi et al. | |
| 5,513,029 A | 4/1996 | Roberts | |

(Continued)

FOREIGN PATENT DOCUMENTS

| | | | |
|---|---|---|---|
| CN | 1252194 A | 5/2000 | |
| CN | 1267979 A | 9/2000 | |

(Continued)

OTHER PUBLICATIONS

Office Action mailed Aug. 25, 2011 in commonly owned U.S. Appl. No. 12/195,717, filed Aug. 21, 2008.

(Continued)

*Primary Examiner* — M. R. Sedighian
(74) *Attorney, Agent, or Firm* — Brinks Gilson & Lione

(57) ABSTRACT

A method and apparatus for loading, detecting, and monitoring channel-associated signals are provided. Channel-associated signals are identified with spread spectrum codes in the electrical domain, and after being modulated to an optical service signal at respective loading points separately, the channel-associated identification signals are transmitted in the optical channel along with the optical signal. At any downstream detecting point, passing optical signals can be converted through photoelectric conversion, and the channel-associated identification signals are de-spread. By detecting the channel-associated signals, it is possible to learn about whether the upstream loading point work normally, whether the optical channel operates normally, etc., and thereby to find possible failures, solve problems, and monitor quality parameters of optical signals in real time, and improve reliability of the optical signal transmission.

2 Claims, 4 Drawing Sheets

(56) References Cited

U.S. PATENT DOCUMENTS

| | | | |
|---|---|---|---|
| 5,877,878 A | 3/1999 | Horiuchi et al. | |
| 6,108,113 A | 8/2000 | Fee | |
| 6,486,985 B1 | 11/2002 | Bischoff et al. | |
| 6,634,809 B1 * | 10/2003 | Ziemann et al. | 398/79 |
| 8,280,248 B2 * | 10/2012 | Li | 398/33 |
| 2002/0181056 A1 * | 12/2002 | Schemmann et al. | 359/161 |
| 2003/0043437 A1 | 3/2003 | Stough et al. | |
| 2003/0067646 A1 | 4/2003 | Wan et al. | |
| 2003/0067651 A1 | 4/2003 | Wan et al. | |
| 2003/0095322 A1 | 5/2003 | Gehlot | |
| 2005/0019040 A1 * | 1/2005 | Trutna, Jr. | 398/183 |
| 2005/0074236 A1 | 4/2005 | Urimindi et al. | |

FOREIGN PATENT DOCUMENTS

| | | |
|---|---|---|
| CN | 1558575 | 12/2004 |
| CN | 1585307 | 2/2005 |
| EP | 0963065 A2 | 12/1999 |
| WO | WO 0060786 A2 | 10/2000 |

OTHER PUBLICATIONS

Office Action mailed Feb. 9, 2012, in commonly owned U.S. Appl. No. 12/195,717, filed Aug. 21, 2008.

Extended European Search Report issued in corresponding European Patent Application No. 06817867.2, mailed Apr. 4, 2011.

Office Action issued in corresponding European Patent Application No. 06817867,2, mailed Nov. 25, 2011.

Written Opinion of the International Searching Authority issued in corresponding PCT Patent Application No. PCT/CN2006/003131, mailed Mar. 3, 2007.

International Search Report Issued in corresponding PCT Application No. PCT/CN2006/003131; mailed Mar. 8, 2007.

* cited by examiner

METHOD AND APPARATUS FOR LOADING, DETECTING, AND MONITORING CHANNEL-ASSOCIATED OPTICAL SIGNALS

CROSS-REFERENCE TO RELATED APPLICATIONS

This application is a continuation of U.S. patent application Ser. No. 12/195,717, filed on Aug. 21, 2008, which is a continuation of International Application No. PCT/CN2006/003131, filed on Nov. 21, 2006. The International Application claims priority to Chinese Patent Application No. 200610033905.4, filed on Feb. 21, 2006. The afore-mentioned patent applications are hereby incorporated by reference in their entireties.

FIELD

The present disclosure relates to the technical field of optical communication, and particularly to a method and apparatus for loading, detecting, and monitoring channel-associated signals.

BACKGROUND

The advancement of optical devices greatly promotes the development of optical communications. The rapid advancement of Wavelength Division Multiplexing (WDM) devices and optical amplifiers has made it possible to transmit data at a rate of Tbps through a single optical fiber. As the optical transmission technologies (e.g., coding, modulation, etc.) become matured, long-range and super long-range transmissions have emerged. Up to now, commercial transmission without electric regenerator can achieve transmission of more than 2000~4000 Km. With the increasing of the bearing capacity of a single optical fiber and the extending of transmission range of transmission without electric regenerator, an all-optical transmission network (OTN) has been put on the agenda.

Owing to the transparency of optical signals, the all-optical transmission network has greatly reduced the cost and brings no similar "electronic bottleneck" effect that occurs in electric signal processing, and the processing capacity of the all-optical transmission network is not restricted by signal rate, protocol, or format, etc. Therefore, the all-optical transmission network is an ideal communication network. As technologies of reconfigurable devices, such as Wavelength Blocker (WB) and Wavelength Select Switch (WSS), become matured, it is practically possible to construct optical transmission networks on the basis of all-optical signal processing.

Due to the transparency of optical signals, no channel-associated overhead information can be carried, and therefore it is unable to monitor the quality of optical signals in the whole course and thus unable to take appropriate measures according to the quality of the optical signals; and it is unable to detect the sources and destinations of the optical signals, avoid possible wrong associations in optical signals, reroute the optical signals, or perform any other processing on the optical signals according to the channel-associated overhead of optical signals. As a result, it is difficult to construct a telecommunication-level optical transmission network that can be comparable to electric signal transmission networks.

International Telecommunication Union-Standardization Sector (ITU-T) proposes in G.709 an out-of-band control method, in which an out-of-band optical supervisory channel (OSC) is utilized to transmit information of different optical channels, thereby implementing management and maintenance of different optical signals. However, the out-of-band OSC can only carry out routing and protective switching over optical signals, but cannot realize supervisory control over quality or performance of optical signals, and therefore it is unable to determine whether the quality of optical signals meets requirements. The out-of-band OSC only transmits part of overheads and it is unable to determine whether the rerouting of optical signals by the reconfigurable devices actually accomplishes channel selection actions specified for the optical signals; and in addition, the failure of the out-of-band OSC itself will also trigger processing on optical signals; although reliability of the out-of-band OSC can be increased by means of a backup strategy, that will bring additional cost and complexity.

In U.S. Pat. No. 5,513,029 entitled "Method and Apparatus for Monitoring Performance of Optical Transmission System", a method for monitoring quality of optical signals is disclosed, in which, by adding a low-frequency interference signal to the laser driving signal of each wavelength conversion unit and modulating the low-frequency interference signal to the output signal of the laser, an identification signal corresponding to the low-frequency interference signal is loaded onto a wavelength signal to form an optical signal. Since the modulation depth of the low-frequency interference signal is usually less than 10%, it has a relatively little effect on the main optical channel. At a monitoring point, the low-frequency interference signal is filtered off from the optical signal during the receiving of the optical signal by a low-frequency receiver. Since the component ratio between the low-frequency interference signal and the wavelength signal is constant, the power of the wavelength signal can be detected by detecting the power of the corresponding low-frequency interference signal; and information, such as optical signal-noise ratio (OSNR), on the corresponding wavelength signal can be calculated by measuring the overall optical power. Although this method can realize monitoring of the quality of the wavelength signal, it has some disadvantages as follows: 1. Different wavelengths must be identified with different frequencies, and the frequency interval must be greater than the frequency resolution of the monitoring point, as a result, the available identification signals are very limited; 2. Although the low-frequency interference signal has a relatively little effect on the main optical channel, it still has some effect on the quality of the wavelength signal; 3. The corresponding relationship between the wavelength signal and the low-frequency interference signal must be configured in advance; otherwise it will be difficult to know which channel of the wavelength signal is monitored; 4. In the method, the optical signals cannot carry channel-associated overhead; protective switching, other channel selection commands and other indication information must be settled through other methods.

In US patent applications No. US20030067646, US20030067647, and US20030067651, all entitled "Channel Identification in Communications Networks", a new method for monitoring quality of optical signals is disclosed, in which two or more frequencies are utilized to identify a same wavelength signal, the wavelength signal has only one frequency identifier at the same time. At a monitoring point, by detecting frequency identifier and time dependence, it can be judged whether the wavelength signal exists; and the corresponding wavelength power and optical signal quality (e.g., OSNR) can be deduced from the time-averaged power. Since in the method more than one frequency is utilized to identify a same wavelength signal, in the case that the same number of available frequency points are used, the method can realize more identification functions than the previous prior art.

However, that method still has the following disadvantages: 1. The energy of the low-frequency signal is relatively concentrated, and still has some effect on the wavelength signal; 2. The corresponding relationship between frequency identifier and wavelength still has to be configured in advance, in order to ascertain to which channel the wavelength signal detected by the monitoring point belongs; 3. The optical signals cannot carry channel-associated overhead information; and therefore protective switching, channel selection commands and other indication information have to be settled through other methods.

In the Chinese patent application No. CN98804006.9 entitled "Method for Transmitting Additional Data Signals and Useful Data Signals through Optical Connection", another method is disclosed, in which a spread spectrum signal is formed by performing a spectrum spreading operation on an additional data signal, and then is superposed at a low amplitude with a useful data signal; after the data signal is received at the receiving end, the spread spectrum signal is separated from the useful data signal by means of frequency domain separation, and then the spread spectrum data is processed correspondingly to recover the original additional data signal. The method solves the problem of the transmission of channel-associated overhead; however, it does not solve the problems of optical signal quality monitoring and differentiation among different identifiers.

In an all-optical network, it is required that additional channel-associated overhead information is added at different transmitting points and is extracted at subsequent monitoring points. The overhead information is required to accomplish monitoring of quality of optical signals and carry channel-associated signaling, such as Automatic Protect Switch (APS) signaling for protective switching, Open Shortest Path First (OSPF) signaling for rerouting, and other information (e.g., source node ID and destination node ID, which are used to identify the source and termination of optical signals). None of the above prior arts meets the above requirements.

SUMMARY

The present disclosure provides a method and apparatus for loading, detecting, and monitoring channel-associated optical signals, so as to overcome the disadvantages in channel-associated monitoring and overhead transmission in the prior arts.

To achieve the above object, the present disclosure puts forward a method for loading a channel-associated optical signal, including the following steps: performing spectrum-spreading operation on the channel-associated signal, by a loading point, with a spread spectrum code corresponding to the loading point, to obtain a channel-associated identification signal of the loading point; modulating a passing optical service signal, by the loading point, with the channel-associated identification signal, to obtain a modulated optical signal.

An embodiment of the present disclosure provides a method for detecting a channel-associated optical signal, including the following steps: splitting a optical signal from an upstream node, by a detecting point, and converting a split optical signal into an electric signal; de-spreading the electric signal, by the detecting point, with a spread spectrum code corresponding to a loading point to be monitored, to obtain a channel-associated signal of the loading point to be monitored corresponding to the spread spectrum code.

An embodiment of the present disclosure provides a method for monitoring a channel-associated optical signal, including the following steps: spectrum-spreading the channel-associated signal, by a loading point, with a spread spectrum code corresponding to the loading point, to obtain a channel-associated identification signal of the loading point; modulating a passing optical service signal, by the loading point, with the channel-associated identification signal, to obtain a modulated optical signal; splitting the optical signal from an upstream node, by a detecting point, and converting a split optical signal into an electric signal; de-spreading the electric signal, by the detecting point, with a spread spectrum code corresponding to the loading point to be monitored, to obtain the channel-associated signal of the loading point to be monitored corresponding to the spread spectrum code.

An embodiment of the present disclosure provides a method for loading a channel-associated optical signal with negative feedback, including the following steps: spectrum-spreading the channel-associated signal, by a loading point, with a spread spectrum code corresponding to the loading point, to obtain a channel-associated identification signal of the loading point; modulating a passing optical service signal, by the loading point, with the channel-associated identification signal, to obtain a modulated optical signal; splitting the optical signal, by a detecting point arranged meanwhile in the loading point, and converting a split optical signal into an electric signal; de-spreading the electric signal, by the detecting point, with the spread spectrum code corresponding to the loading point, to obtain the channel-associated signal of the loading point, where the channel-associated signal is adapted to control modulation depth at the loading point.

An embodiment of the present disclosure provides an apparatus for loading a channel-associated optical signal, including: a channel-associated signal generator, adapted to generate a channel-associated signal of a loading point; a spread spectrum code generator, adapted to generate a spread spectrum code of the loading point; a spectrum spreading unit, adapted to spectrum-spread the channel-associated signal with the spread spectrum code, to obtain a channel-associated identification signal; a loading unit, adapted to modulate a passing optical service signal with the channel-associated identification signal, to obtain a modulated optical signal.

An embodiment of the present disclosure provides an apparatus for detecting a channel-associated optical signal, including: an optical splitter, coupled to an optical channel and adapted to split a modulated optical signal; a photoelectric conversion circuit, adapted to conve rt a split optical signal into an electric signal; a spread spectrum code generator, adapted to generate a spread spectrum code corresponding to a loading point to be detected; a de-spreading unit, adapted to de-spread an electric signal with a spread spectrum code; a channel-associated signal processing unit, adapted to detect a de-spread signal and process the signal according to a detection result.

An embodiment of the present disclosure provides an apparatus for monitoring a channel-associated optical signal, including a loading device and a detecting device, wherein the loading device includes a channel-associated signal generating unit, a first spread spectrum code generator, a spectrum spreading unit, and a loading unit: the channel-associated signal generating unit is adapted to generate a channel-associated signal of a loading point, the first spread spectrum code generator is adapted to generate a spread spectrum code of a loading point, the spectrum spreading unit is adapted to spectrum-spread the channel-associated signal with the spread spectrum code to obtain a channel-associated identification signal, and the loading unit is adapted to modulate a passing optical service signal with the channel-associated identification signal to obtain a modulated optical signal; the detecting device includes a n optical splitter, a photoelectric conversion circuit, a second spread spectrum code generator, a de-spreading unit, and a channel-associated signal processing unit: the optical splitter is coupled to an optical channel and adapted to split a modulated optical signal, the photoelectric conversion circuit is adapted to convert a split optical signal into an electric signal, the second spread spectrum code generator is adapted to generate a spread spectrum code corresponding to a loading point to be detected, the de-spreading unit is adapted to de-spread an electric signal with a corresponding spread spectrum code, and the channel-associated signal processing unit is adapted to detect a de-spread signal and process the signal according to a detection result.

The present disclosure provides a method and an apparatus for loading channel-associated optical signals, in which, a channel-associated signal is identified with a spread spectrum code in electrical domain, and the spectrum width of channel-associated signal is spread, so that the power spectrum density of the channel-associated identification signal is reduced, thereby reducing the interference of the channel-associated identification signal to optical service signals. With the same modulation depth, the channel-associated identification signal after being spectrum-spread has less interference to optical service signals; after being modulated to an optical service signal at respective loading points separately, the channel-associated identification signals are transmitted in the optical channel along with the optical signal. At any downstream detecting point, passing optical signals can be converted through photoelectric conversion, and the channel-associated identification signals are de-spread. By detecting the channel-associated signals, it is possible to learn about whether the upstream loading point works normally, whether the optical channel operates normally, etc., and thereby to find possible failures, solve problems, and monitor quality parameters of optical signals in real time, and improve reliability of the optical signal transmission.

According to the method for detecting a channel-associated optical signal provided by the present disclosure, the channel-associated signal of a corresponding loading point can be detected at a downstream detecting point; by processing the de-spread channel-associated signal, the working state of the upstream loading point and the state of network between the loading point and the detecting point can be judged according to the power component of the channel-associated signal, so as to attain the object of monitoring network performance by means of monitoring the channel-associated signal; in addition, the channel-associated signal can also carry overhead information, so that the transmission of channel-associated overhead information can be realized.

The apparatus for monitoring channel-associated optical signals is provided so that the channel-associated signal from the upstream loading point can be obtained, the upstream loading point and the state of network can be monitored, a passing optical signal can be loaded with a channel-associated signal of a loading point, the loading point can be monitored at the downstream detecting points, and therefore the reliability of optical signal transmission can be improved.

Furthermore, in order to avoid problems, e.g. that the modulation depth of optical service signals modulated by a channel-associated identification signal is insufficient, the channel-associated signal monitoring device can carry out feedback control over the optical signal modulated by the channel-associated signal monitoring device itself. The detecting device can judge whether the modulation depth is appropriate, according to the power component of the channel-associated signal in the modulated optical signal, and if the modulation depth is too low or too high, the loading device is controlled to re-modulate the optical service signal, thereby ensuring appropriate modulation depth of the optical service signals modulated by the channel-associated identification signal.

BRIEF DESCRIPTION OF THE DRAWINGS

The present disclosure will be further described in detail by way of specific embodiments with reference to the accompanying drawings, in which.

DETAILED DESCRIPTION OF THE EMBODIMENTS

Figure 1:
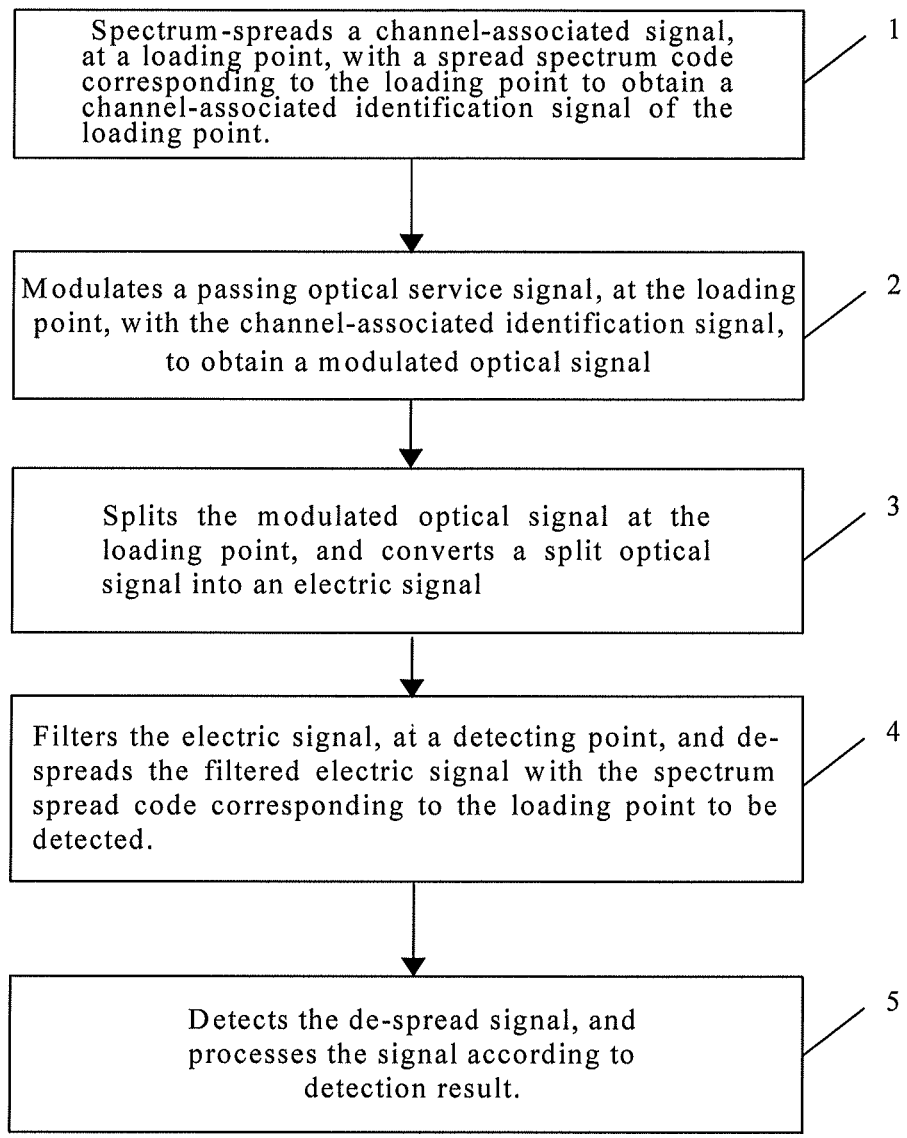
FIG. 1 is a schematic flow diagram of an embodiment of the present disclosure.

A method for monitoring a channel-associated optical signal according to an embodiment of the present disclosure, as shown in FIG. 1, includes the following steps:

A: Loading

Step 1: A loading point spectrum-spreads the channel-associated signal, with a spread spectrum code corresponding to the loading point, to obtain a channel-associated identification signal of the loading point;

Step 2: The loading point modulate a passing optical service signal, with the channel-associated identification signal of the loading point, to obtain a modulated optical signal;

B: Detecting

Step 3: A detecting point splits the modulated optical signal, and converts a split optical signal into an electric signal;

Step 4: The detecting point filters the electric signal, and de-spreads the filtered electric signal with the spread spectrum code corresponding to the loading point to be detected by the detecting point;

Step 5: The detecting point detects the de-spread signal and processes the de-spread signal according to the detection result.

The loading and detecting in the above monitoring of channel-associated optical signal can be applied separately or in combination. Moreover, in actual applications, the filtering operation in the above Step 4 can be omitted.

A channel associated signal may include the ID information of a loading point, the overhead information needed to be transmitted, a string of fixed, random, or designated bits or bytes, or any combination of them.

A spread spectrum code includes unipolar spread spectrum codes, such as an orthogonal prime code, an optical orthogonal code, a quadratic congruence code, an extended prime code, an extended quadratic congruence code, a hybrid code, or an improved prime code, etc. Spreading the channel-associated signal with a unipolar spread spectrum code can avoid mutual interferences among spread spectrum codes corresponding to a plurality of loading points, improve reliability of the loading of the channel-associated signal, and reduce effects on the optical service signal.

The period of the channel-associated identification signal is greater than or equal to a preset times of the period of an optical service signal. For example, in general, the period of the channel-associated identification signal is greater than or equal to 10 times of the period of the optical service signals, so as to avoid the interference of the channel-associated identification signal to the optical service signals.

Because the effect of a channel-associated identification signal on an optical service signal is related to the modulation depth, the modulation depth of the optical service signal modulated by the channel-associated identification signal is controlled within the range from 3% to 5%. In some applications, the modulation depth of the optical service signal modulated by the channel-associated identification signal can be up to 10%. In general, the modulation depth of the optical service signal modulated with the channel-associated identification signal is smaller than or equal to a preset adjustment value, such as 10%, or approximately 0.5 dB.

The method further includes a step of processing the channel-associated signal before Step 1 as follows: assembling several channel-associated overheads into a frame, and inserting a fixed or variable frame header before the frame, or adding a cyclic redundancy check (CRC) byte in the frame, to carry out error correction for the channel-associated overheads.

The method for modulating the optical service signal in Step 2 includes: connecting the optical service signal to an input port of an electrically-controlled variable optical attenuator (EVOA), utilizing the channel-associated identification signal to control the loss of the optical service signal, the intensity of the channel-associated identification signals being reflected by the variations of intensity of the optical service signals, thereby achieving the modulation of the optical service signal with the channel-associated identification signal; or connecting the optical service signal to an input port of a semiconductor optical amplifier (SOA), utilizing the channel-associated identification signals to control the gain of the optical service signal, superimposing the channel-associated identification signal with the optical service signal, therefore accomplishing the loading of the channel-associated identification signal.

The method can further include an analog-digital conversion operation after the filtering of the electric signal in Step 4, so that the digital signal can be processed in subsequent operations.

In Step 4, the de-spreading of the channel-associated identification signal can be realized in the following two ways: 1. if there is only a single channel-associated identification signal, the channel-associated identification signal is de-spread with the spread spectrum code corresponding to the loading point to obtain the channel-associated signal of the loading point; 2. if the spectrum-spread channel-associated identification signals of a plurality of loading points are mixed, the filtered electric signal is split first, and then the split electric signals are de-spread in parallel, with the spread spectrum codes corresponding to the loading points, so as to obtain the channel-associated signals corresponding to the loading points respectively. For mixed optical service signals at different wavelengths, the loading point can load the channel-associated identification signals to different wavelengths of optical service signals at the same time and transmit the mixed signals, and at a downstream detecting point, the channel-associated identification signals loaded at different loading points to the optical signals that are dropped at the downstream detecting point can be de-spread simultaneously, so as to improve the efficiency of monitoring of channel-associated signals.

In Step 5, the method of detecting of the de-spread signals includes the following four approaches: 1. detecting the power component of the channel-associated signals in the de-spread signal, and judging whether the corresponding channel-associated signal exists; 2. detecting the power component of the channel-associated signals in the de-spread signals, and comparing the power component with a decision-threshold to judge whether the channel-associated signal exists; 3. detecting the power component of the channel-associated signal in the de-spread signal, and calculating the power component and OSNR of the corresponding service signal; 4. detecting the overhead of the channel-associated signal in the de-spread signal, and judging whether the corresponding channel-associated signal exists according to the overhead.

In the third detection approach, the calculating of the power component and OSNR of the corresponding service signals includes: the total power of the direct current component of the converted electric signal in Step 3 is Ptotal, and the power component of each channel-associated signal, by the detection of the power component and in combination with the known modulation depth, is calculated as Ps1, Ps2, ..., Psn; supposing the power of Amplified Spontaneous Emission (ASE) noise introduced into the optical signal by the amplifier in the circuit is Pase, the Ptotal=Ps1+Ps2+ ... + Psn+Pase; calculating the ASE component, and then calculating the OSNR of the service signal.

Figure 2:
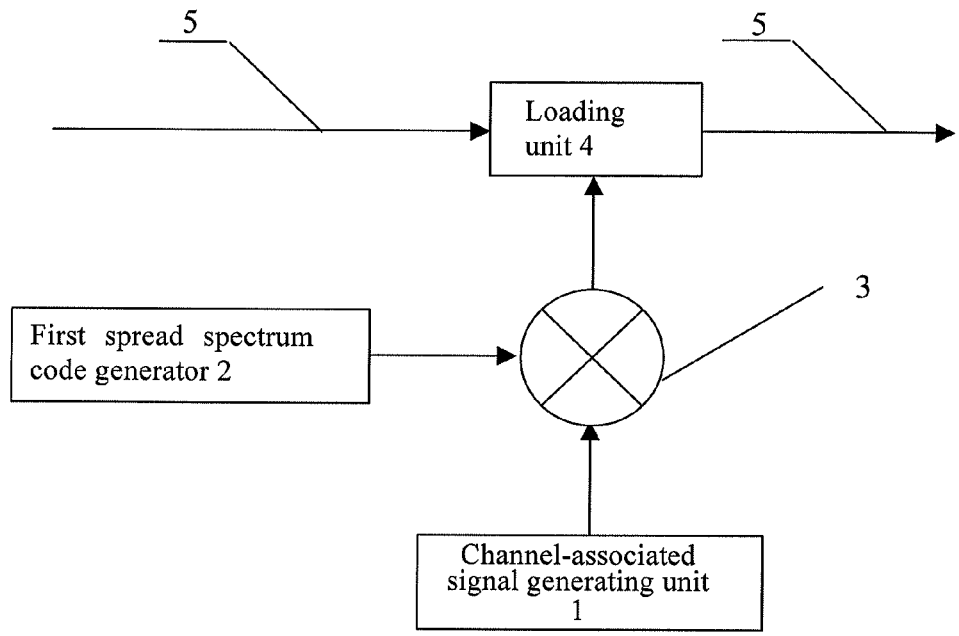
FIG. 2 is an architecture diagram of an apparatus for loading channel-associated optical signals according to an embodiment of the present disclosure.

An apparatus for loading channel-associated signals is provided, as shown in FIG. 2, including a channel-associated signal generating unit 1, a first spread spectrum code generator 2, a spectrum spreading unit 3, and a loading unit 4. The first input end of the spectrum spreading unit 3 is connected to the output end of the channel-associated signal generating unit 1, and the second input end of the spectrum spreading unit 3 is connected to the output end of the first spread spectrum code generator 2. The loading unit 4 is connected in series to the optical channel 5, and the input end of the loading unit 4 is connected to the output end of the spectrum spreading unit 3.

The loading unit 4 includes a modulator, a variable attenuator or an adjustable gain device. The variable attenuator can be an Electrically-controlled Variable Optical Attenuator (EVOA), and the adjustable gain device can be an SOA.

Figure 3:
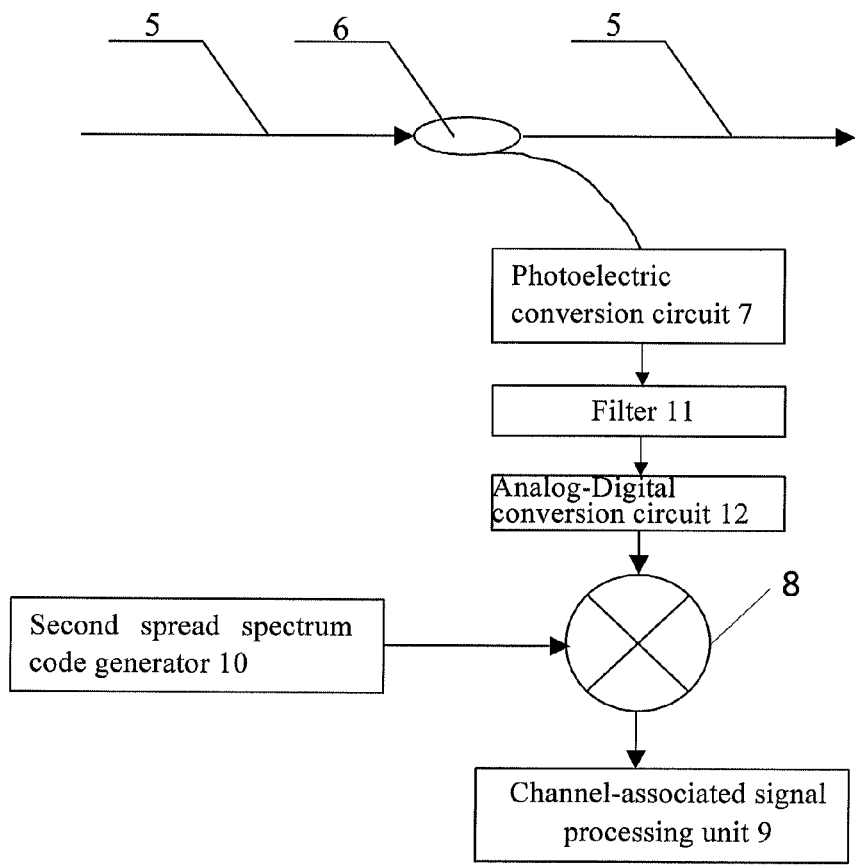
FIG. 3 is an architecture diagram of an apparatus for detecting channel-associated optical signals according to an embodiment of the present disclosure.

Accordingly, a device for detecting channel-associated signals is provided, as shown in FIG. 3, including a photoelectric conversion circuit 7, a de-spreading unit 8, a second spread spectrum code generator 10, an optical splitter 6, a filter 11, and a channel-associated signal processing unit 9. The optical splitter 6 is coupled to the optical channel; the input end of the photoelectric conversion circuit 7 is connected to the output end of the optical splitter 6, and the output end of the photoelectric conversion circuit 7 is connected to the input end of the filter 11, and the output end of the filter 11 is connected through a analog-digital conversion circuit 12 to the first input end of the de-spreading unit 8; the second input end of the de-spreading unit 8 is connected to the output end of the second spread spectrum code generator 10, and the output end of the de-spreading unit 8 is connected to the input end of the channel-associated signal processing unit 9; the channel-associated signal processing unit 9 is adapted to detect signals output from the de-spreading unit 8.

In case that a modulated optical signal is loaded with a plurality of channel-associated identification signal, in order to improve the efficiency of de-spreading, a de-multiplexer is arranged in series between the filter and the de-spreading unit to de-multiplex the electric signal filtered by the filter and then the de-multiplexed signals are output to a plurality pf de-spreading units, so that the de-spreading units can de-spread the de-multiplexed electric signals simultaneously according to the corresponding spread spectrum codes generated by the second spread spectrum code generator. The filter 11 and analog-digital conversion circuit 12 set forth above are optional devices.

In order to control the modulation depth of the optical service signal modulated by the channel-associated identification signal, the present disclosure puts forward another method for monitoring channel-associated signals, i.e., a method for loading channel-associated signals having negative feedback, including the following steps:

Step 1: A loading device spectrum-spreads a channel-associated signal, with a corresponding spread spectrum code, to obtain a channel-associated identification signal for the loading point;

Step 2: The loading device modulates a passing optical service signal, with the channel-associated identification signal for the loading point, to obtain a modulated optical signal;

Step 3: A detecting device splits the modulated optical signal, and convert a split optical signal into an electric signal;

Step 4: The detecting device filters the electric signal, and de-spreads the filtered electric signal, with the spread spectrum code corresponding to the loading device;

Step 5: The detecting device detects the de-spread signals, and provides feedback to the loading device according to the detection result;

Step 6: The loading device processes a passing optical service signal, according to the detection result.

Similarly, the filtering operation in Step 4 is optional, and an analog-digital conversion operation can be performed on the electric signal after being filtered in Step 4, so that digital signals are processed in subsequent operations.

In Step 6, if the detecting device detects that the power component of the channel-associated signal in the de-spread signals is lower than the minimum power threshold, the loading device increases the modulation depth of the optical service signal modulated by the channel-associated identification signal; if the detecting device detects that the power component of the channel-associated signals in the de-spread signals is higher than the maximum power threshold, the loading device decreases the modulation depth of the optical service signal modulated by the channel-associated identification signal; if the detecting device detects that the power component of the channel-associated signals in the de-spread signals is between the minimum power threshold and the maximum power threshold, the loading device does not re-modulate the optical service signal.

Figure 4:
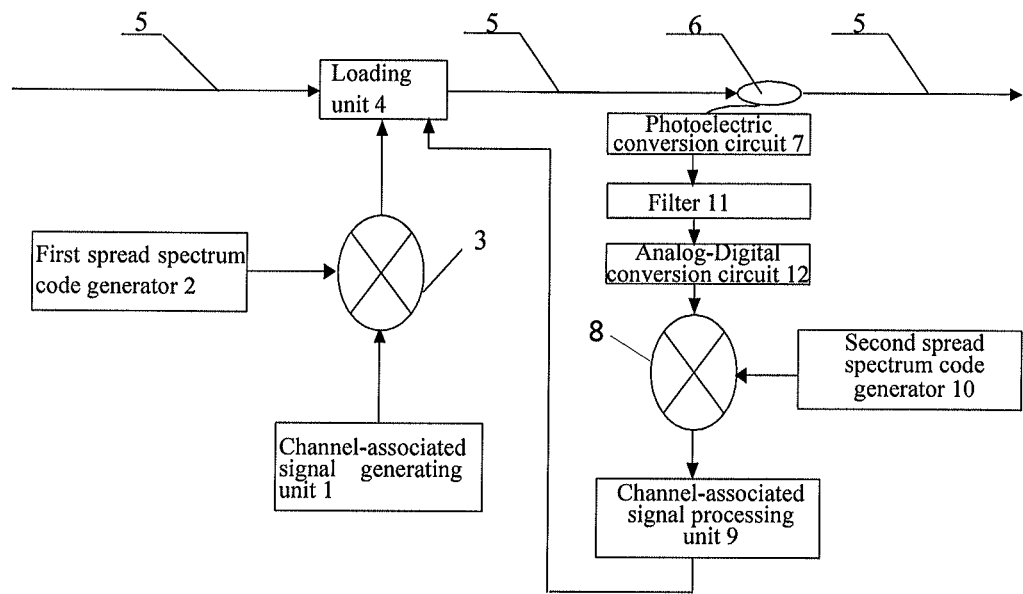
FIG. 4 is an architecture diagram of an apparatus for monitoring channel-associated optical signals according to an embodiment of the present disclosure.

Accordingly, an apparatus for monitoring channel-associated signals is provided, as shown in FIG. 4, including a loading device and a detecting device.

Wherein, the loading device includes a channel-associated signal generating unit 1, a first spread spectrum code generator 2, a spectrum spreading unit 3, and a loading unit 4. The channel-associated signal generating unit 1 is adapted to generate a channel-associated signal for the loading point; the first spread spectrum code generator 2 is adapted to generate a spread spectrum code for the loading point; the spectrum spreading unit 3 is adapted to spectrum spread the channel-associated signal with the spread spectrum code and obtain a channel-associated identification signal; the loading unit 4 is adapted to modulate a passing optical service signal with the channel-associated identification signal, to obtain a modulated optical signal.

The detecting device includes an optical splitter 6, a photoelectric conversion circuit 7, a filter 11, a second spread spectrum code generator 10, a de-spreading unit 8, and a channel-associated signal processing unit 9; the optical splitter 6 is coupled to the optical channel and is adapted to split the modulated optical signal; the photoelectric conversion circuit 7 is adapted to convert a split optical signal into an electric signal; the filter 11 is adapted to filter the electric signals, mainly to filter off DC component and high frequency component; the analog-digital conversion circuit 12 is adapted to carry out analog-digital conversion on a filtered signal; the second spread spectrum code generator 10 is adapted to generate a spread spectrum code corresponding to a loading point; the de-spreading unit 8 is adapted to de-spread a filtered electric signal after being analog-digital converted, with the corresponding spread spectrum code; the channel-associated signal processing unit 9 is adapted to detect a de-spread signal and feed back a detection result to the loading unit 4. Similarly, the filter 11 and the analog-digital conversion circuit 12 in the detecting device are optional.

Figure 5:
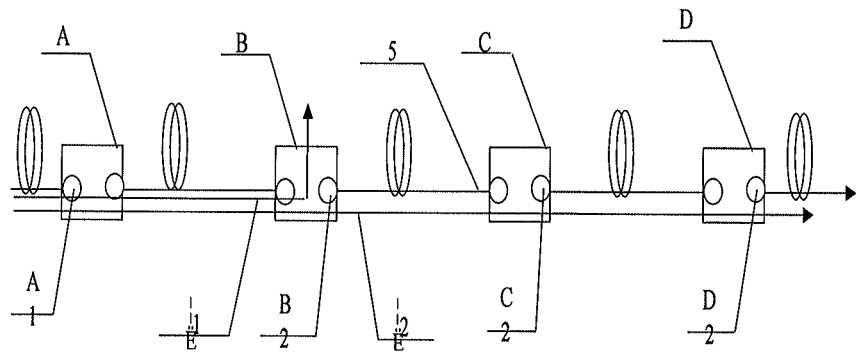
FIG. 5 is an architecture diagram of a first embodiment of the present disclosure.

According to Embodiment 1, as shown in FIG. 5, there are four units A, B, C, and D in the optical channel 5, which are connected to each other via optical fibers. Each of the units may be a site, or a function unit distributed in a site or among different sites. Each of the units may be a loading point or a detecting point. Each loading point is assigned with a unique identifiable spread spectrum code.

When a loading point of a unit performs the function of loading a channel-associated identification signal, all wavelength signals passing through the loading point will carry the channel-associated identification signal loaded at the loading point. Furthermore, the channel-associated identification signal can be detected and extracted at a monitoring point in downstream units through which the wavelength signals pass.

In this embodiment, the optical service signal at wavelength λ1, after passing through the loading point A1 in the first unit A, forms the first optical signal; the optical service signal at wavelength λ2, after passing through the loading point A1 in the first unit A, forms the second optical signal. The first optical signal is dropped at the second unit B, while the second optical signal is transmitted to the fourth unit D. The channel-associated identification signal loaded at the first unit A can be detected by a detecting point B2 in the second unit B, a detecting point C2 in the third unit C, or a detecting point D2 in the fourth unit D.

Through above processes, the channel-associated identification signal can be loaded at an upstream loading point, to notify a downstream site that an optical signal passes through the loading point. The downstream detecting point can de-spread, with a corresponding spread spectrum code, the channel-associated identification signal in the optical signal that is received or passes through the detecting point, and by processing the de-spread channel-associated signal, judge the working state of the upstream function unit and the network situation, so as to attain the object of monitoring network performance and further for transmitting overhead information.

Figure 6:
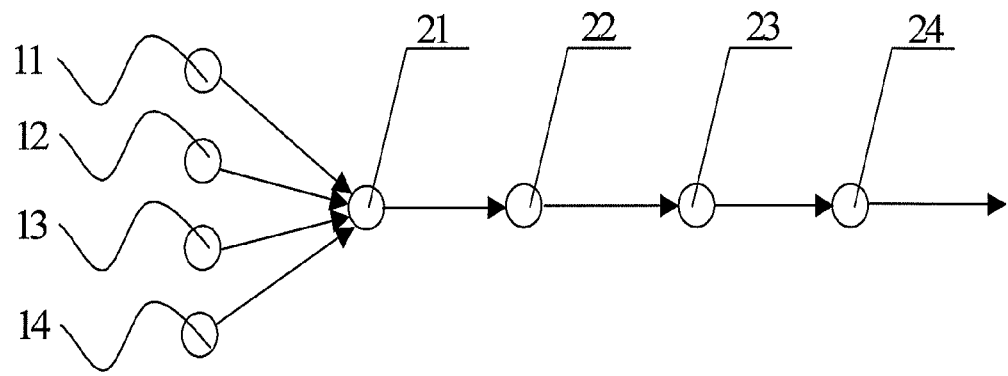
FIG. 6 is an architecture diagram of a second embodiment of the present disclosure.

According to Embodiment 2, as shown in FIG. 6, in a star network, channel-associated identification signals are loaded to different optical signals, and the channel-associated identification signals are detected in the combined optical signals.

In this manner, in a WDM (Wavelength Division Multiplexer) network, each wavelength signal is loaded a different identifier, and in the optical multiplexing section, the identifier can be detected, so as to judge whether a wavelength signal exists or not and execute further operations such as controlling the power output from an amplifier; or the current operating condition of the network can be judged through the detection of power and OSNR of the wavelength signals, and it can be decided whether to execute further operations such as judging whether a wavelength blocking occurs and whether to carry out protection, etc.

Figure 7:
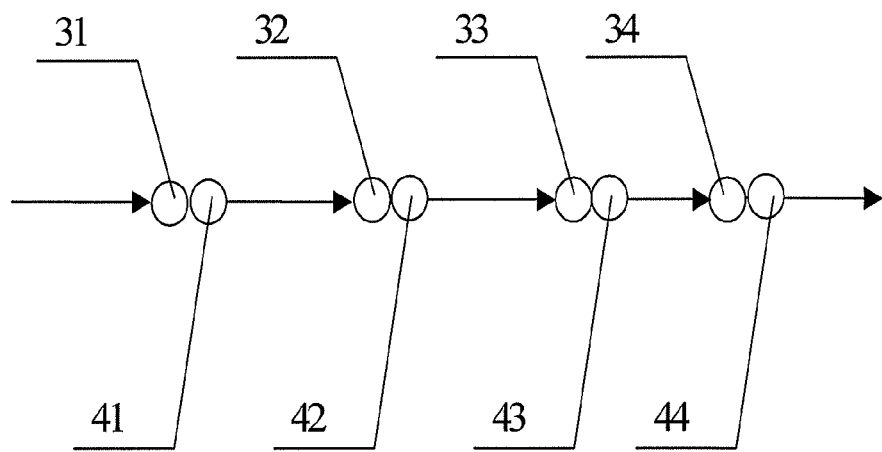
FIG. 7 is an architecture diagram of a third embodiment of the present disclosure.

According to Embodiment 3, as shown in FIG. 7, in a chain network, channel-associated identification signals are loaded at a plurality of nodes, and each of the plurality of nodes has also a monitoring point.

In this manner, in a WDM network, the overhead is loaded in each optical transmission section, and the overhead information is transmitted down along the entire link. Through the channel-associated identification signal added in each optical transmission section, the ASE component added in each transmission section can be ascertained, so as to learn about the optical signal deterioration in each transmission section and thereby notify the network maintenance personnel to check whether the transmission section is abnormal.

The applications of the method provided in the present disclosure include, but is not limited to one or combination of the above two ways. For example, in a WDM network, the above two ways are used in combination when both the wavelength signals and the signals in optical multiplexing section (OMS) and optical transmission section (OTS) are required to be monitored.

The foregoing descriptions are merely illustrative of the preferred embodiments of the disclosure and it shall be noted that those ordinarily skilled in the art can make numerous modifications and variations without departing from the spirit of the disclosure, and these modifications and variations shall be considered as coming into the scope of the disclosure as defined in the appended claims.

What is claimed is:

1. A method for monitoring a channel-associated optical signal, comprising:
spectrum-spreading the channel-associated signal, by a loading point, with a spread spectrum code corresponding to the loading point, to obtain a channel-associated identification signal of the loading point;
modulating a passing optical service signal, by the loading point, with the channel-associated identification signal, to obtain a modulated optical signal;
splitting the optical signal from an upstream node, by a detecting point, and converting a split optical signal into an electric signal;
de-spreading the electric signal, by the detecting point, with a spread spectrum code corresponding to the loading point to be monitored, to obtain the channel-associated signal of the loading point to be monitored corresponding to the spread spectrum code, wherein, de-spreading the electric signal comprises: de-multiplexing the electric signal, and de-spreading the de-multiplexed electric signals with spread spectrum code corresponding to a plurality of loading points respectively, to obtain channel-associated signals corresponding to the respective loading points.

2. An apparatus for monitoring a channel-associated optical signal, comprising a loading device and a detecting device, wherein:
the loading device comprises a channel-associated signal generating unit, a first spread spectrum code generator, a spectrum spreading unit, and a loading unit: the channel-associated signal generating unit is adapted to generate a channel-associated signal of a loading point; the first spread spectrum code generator is adapted to generate a spread spectrum code of a loading point; the spectrum spreading unit is adapted to spectrum-spread the channel-associated signal with the spread spectrum code to obtain a channel-associated identification signal; the loading unit is adapted to modulate a passing optical service signal with the channel-associated identification signal to obtain a modulated optical signal; and
the detecting device comprises an optical splitter, a photoelectric conversion circuit, a second spread spectrum code generator, a de-spreading unit, and a channel-associated signal processing unit: the optical splitter is coupled to a optical channel and adapted to split a modulated optical signal; the photoelectric conversion circuit is adapted to convert a split optical signal into an electric signal; the second spread spectrum code generator is adapted to generate a spread spectrum code corresponding to a loading point to be detected; the de-spreading unit is adapted to de-spread an electric signal with a corresponding spread spectrum code; the channel-associated signal processing unit is adapted to detect a de-spread signal and process the signal according to a detection result, wherein, the detecting device comprises a de-multiplexer, and the de-multiplexer is adapted to de-multiplex an electric signal, output the de-multiplexed electric signals to a plurality of de-spreading units, which perform de-spreading in parallel, with spread spectrum codes generated by the spread spectrum code generator.

* * * * *